United States Patent [19]

Loomis

[11] 4,280,435
[45] Jul. 28, 1981

[54] ONE PIECE ANCHOR FOR ADJUSTABLY TETHERING A ROPE SUSPENDED BOAT FENDER

[76] Inventor: Donald W. Loomis, 1118 Sanger St., Philadelphia, Pa. 19124

[21] Appl. No.: 932,790

[22] Filed: Aug. 11, 1978

[51] Int. Cl.$^3$ ............... B63B 59/02; F16G 11/00
[52] U.S. Cl. .................. 114/219; 24/129 B; 114/221 R
[58] Field of Search ............... 114/218, 219, 221 R, 114/230, 293; 24/129 R, 129 A, 129 B, 129 D; 248/493

[56] References Cited

U.S. PATENT DOCUMENTS

| | | | |
|---|---|---|---|
| 338,037 | 3/1886 | Clow | 256/35 |
| 678,533 | 7/1901 | Bancker | 24/129 D |
| 837,247 | 11/1906 | Nuttall | 24/129 D |
| 1,044,805 | 11/1912 | Normand | 24/137 R |
| 1,546,798 | 7/1925 | Seagren | 24/129 D |
| 1,806,162 | 5/1931 | Hahn | 24/129 B |
| 2,197,839 | 4/1940 | Roberts et al. | 114/219 |
| 3,575,371 | 4/1971 | Carlstedt | 24/129 B |
| 3,736,925 | 6/1973 | Erman | 128/78 B |
| 3,930,288 | 1/1976 | Black et al. | 24/129 R |

FOREIGN PATENT DOCUMENTS

| | | | |
|---|---|---|---|
| 8544 | of 1898 | United Kingdom | 24/129 D |
| 14386 | of 1912 | United Kingdom | 135/1 |

OTHER PUBLICATIONS

Goldberg's *Marine Catalog,* 1977, pp. 30, 31.
Chris Craft *Gifts & Gear,* p. 51.

*Primary Examiner*—Charles E. Frankfort
*Attorney, Agent, or Firm*—Woodcock, Washburn, Kurtz, Mackiewicz & Norris

[57] ABSTRACT

A novel one piece anchor is described for adjustably tethering a rope suspended boat fender against the side of a boat so that the boat fender will be appropriately positioned with respect to the level of a dock against which the boat may be moored. In the preferred embodiment, the novel anchor comprises a substantially elongate member of uniform thickness, one end of which is differentiated into a hook, and the other end of which is rounded. A number of apertures appropriately defined therethrough, at least one of which is disposed near the rounded end thereof receives a rope which is threaded from one side of the anchor through an intermediate aperture, and then around one of the longitudinal edges of the anchor for theading from the same side into a second aperture located near the remote end of the anchor. Once threaded, the intermediate portion of the rope disposed between the two apertures is movable between positions engaging either longitudinal edge of the anchor. When the intermediate rope portion engages one edge of the anchor, movement of the rope is permitted but frictionally retarded by the anchor, whereas when the intermediate rope portion is moved to engage the other edge of the anchor an end portion of the rope is trapped and engaged between the intermediate rope portion and a face of the anchor, to restrain the rope in a tethering position. To unlock the rope from the tethering position, the free end may be pulled with sufficient force toward the rounded free end of the anchor, whereupon the rope will automatically move into an unlocked position for repositioning of the boat fender.

2 Claims, 4 Drawing Figures

ONE PIECE ANCHOR FOR ADJUSTABLY TETHERING A ROPE SUSPENDED BOAT FENDER

BACKGROUND OF THE INVENTION

The advantage of suspending boat fenders over the sides of boats to protect the hull from damage caused by collision against adjacent moorings has long been recognized. In order to minimize the effective vertical length necessary for such boat fenders, however, frequent relative vertical adjustment of those boat fenders is often necessary in order to accommodate tidal and mooring-height variations.

Deck cleats and other rope fastening means have often been used to anchor and suspend boat fenders over the sides of boats equipped therewith. Unfortunately, tying and untying ropes from those cleats or other anchoring devices is time consuming and awkward, particularly during docking maneuvers when the appropriate positioning of the boat fenders may first be ascertained, and when their appropriate positioning is of vital importance. Additionally, while deck cleats are often able to satisfactorily anchor these fenders once the lashing operation is completed, upon unlashing of the fender ropes therefrom, the entire weight of the boat fender must often be supported entirely by the sailor who is adjusting same, thereby presenting a possibility that the fender may be dropped into the water during this adjustment process.

More recently, other types of fender anchors or cleats have been provided which are intended to eliminate the tying and untying of fender lines during the adjustment of those fenders. While these fender line anchors or cleats have experienced some degree of success, they are often expensive, limited to use with particular fender line sizes or types, increase fender line wear, are awkward, and retain and release the fender lines for adjustment with varying degrees of effectiveness. Additionally, many of those cleats or anchors which are available are relatively complex, comprising many parts, springs, etc. which are particularly prone to corrosive attack when used in or around salt water.

Adjustable rope anchors or cleats are, of course, known for other than marine applications. Examples of one piece anchors are, for example, disclosed in U.S. Pat. Nos. 338,037 (Clow); 678,533 (Bancker); 837,247 (Nuttall); 1,044,805 (Normand); 1,546,798 (Seagren); 3,736,925 (Erman); British Specification No. 14,386, dated 1911 (Bromfield) and British Specification No. 8544, dated 1897 (Humphreys).

SUMMARY OF THE INVENTION

The present invention relates to the provision of a novel one piece anchor for adjustably tethering a rope suspended boat fender. The preferred embodiment anchor is formed from a substantially rectangular piece of strap material, one of the ends of which is differentiated into an anchoring means such as a hook-shaped end portion, and the other, remote free end of which is rounded to allow a rope portion to slide therearound. A plurality of apertures (eyelets), at least one of which is disposed adjacent to the rounded free end of the anchor are provided through a substantially planar plate portion of the anchor. In the preferred embodiment, a single rope extends from a first side of the strap through an intermediate aperture (eyelet) and out of the other (second) side of the strap, then around a longitudinal edge of the strap to enter the aperture (eyelet) adjacent to the free end of the anchor to the same (first) side of the strap, to define an intermediate portion of the rope which is disposed between the two apertures, and to define an end portion of the rope, which is that portion of the rope which extends out of the second side of the strap beyond the second aperture. Depending on whether the intermediate rope portion engages one or the other of the longitudinal edges of the strap, the anchor is either in its locked or unlocked position, by virtue of the fact that during movement of the intermediate rope portion from the unlocked position around the free end of the anchor to engage the other longitudinal edge, the end portion of the rope is trapped and engaged between the intermediate portion and the face of the second side of the strap to lock the rope in that position.

In the preferred embodiment a third aperture is formed between the aforementioned intermediate aperture, and the hook-shaped end portion for receiving and retaining the end portion of the rope in the locked position. If it is desired to unlock the rope, the end portion need only be grasped and pulled downwardly into a coaxial releasing position where the end portion of the rope interferes with and draws the intermediate portion along the longitudinal edge engaged thereby and around at least a portion of the rounded free end of the anchor. Once the intermediate portion passes over-center with respect to the axis of the intermediate and remote end apertures, tension applied from either end of the rope will cause the intermediate rope portion to continue moving around the rounded free end and up to engage the other longitudinal edge of the strap portion of the anchor. In this unlocked position, the rope is allowed to slide through the two apertures to adjust the position of the boat fender, but is frictionally retarded, thereby reducing any possibility that the boat fender will be released into the water. When the desired adjusted position is reached, the fender is again tethered simply by grasping the intermediate rope portion and slipping it around the rounded end of the anchor to again lock the boat fender in its desired position.

Accordingly, a primary object of the present invention is the provision of an extremely simple, low-cost, adjustable anchor for use in tethering a rope suspended boat fender.

Another object of the present invention is the provision of an anchor and method for utilizing same which simplifies the adjustment of boat anchors tethered thereto.

These and other objects of the present invention will become apparent from the following more detailed description.

DESCRIPTION OF THE PREFERRED EMBODIMENTS

Figure 1:
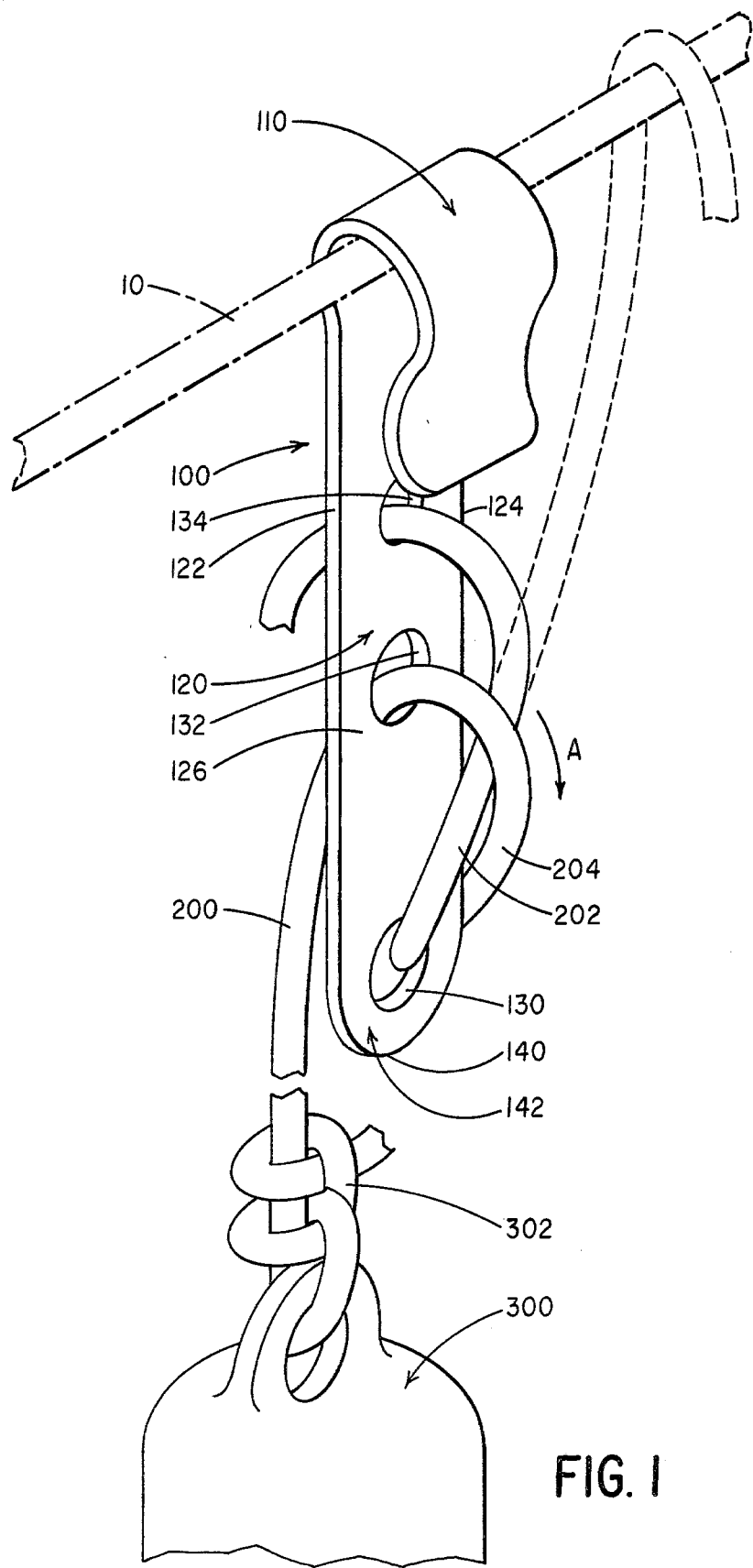
FIG. 1 is an isometric view of the preferred embodiment of the present invention showing a portion of a boat fender attached to a foreshortened length of rope which is threaded through a plurality of apertures in the anchor, the relative spacings between the rope and the face of the anchor being somewhat exaggerated for purposes of illustration, the preferred embodiment anchor of the present invention being shown supported by a rail, shown in phantom, and an alternate line retaining position over that rail being shown in dotted outline.

Although specific forms of the invention have been selected for illustration in the drawings, and the following description is drawn in specific terms for the purpose of describing these forms of the invention, this description is not intended to limit the scope of the invention which is defined in the appended claims.

Referring to FIG. 1 the preferred embodiment anchor designated generally 100 is seen to be hooked over a rod 10 which may be a rope, line, pole, etc. associated with the boat deck or other portion of a boat from which the boat fender is to be suspended. As seen in FIG. 1, the preferred embodiment anchor 100 generally comprises an anchoring means for attaching the anchor to a portion of the boat. In the preferred embodiment this is a hook-shaped end portion designated generally 110. A rope receiving means is provided extending generally away from the hook-shaped end portion 110 and which acts to selectively restrain the rope in preselected tethered positions or to release the rope for permitting retarded movement of the rope between preselected tethered positions to thereby permit the adjustment of the fender with respect to the side of the boat. In the preferred embodiment, the rope receiving means comprises a substantially planar strap portion designated generally 120 which comprises two substantially parallel longitudinal edges 122, 124 and front and back substantially planar faces, front face 126 being visible in the drawings. Three apertures—free end aperture 130, intermediate aperture 132, and rope retaining aperture 134—are defined through the strap generally coaxially with the hook-shaped end portion 110. As shown particularly in FIG. 1, the diameters of the free end aperture 130 and intermediate aperture 132 are somewhat larger than the diameter of the rope retaining aperture 134, however, all of the apertures are substantially larger than the diameter of the rope designated generally 200 which is to be used with the anchor. As seen in FIG. 1, longitudinal edges 122 and 124 extend to and are joined by a rounded edge 140 which defines a remote free end designated generally 142 of the anchor. In FIG. 1, the rope is shown threaded and disposed in its locked configuration. A boat fender designated generally 300 is tied by a knot 302 to one end of anchoring portion 200 of the rope which extends up and is threaded into intermediate aperture 132 from the back side of the strap portion designated generally 120. An intermediate rope portion 204 extends out of intermediate aperture 132 over the front surface 126 of the strap to engage longitudinal edge 124 of the strap portion. This intermediate rope portion then extends over the back strap face into the back side of aperture 130. An intermediate rope portion 204 is thus defined between apertures 130 and 132. In the locked position the rope 202 extends out of the front side of aperture 130, up between the intermediate rope portion 204 and the front face 126 of the strap portion to terminate in a free end 202 which is either threaded through retaining aperture 134 or is retained as shown in phantom over rod 10. As tension is applied by the boat fender 300, therefore, the intermediate rope portion 204 will be caused to press down on the free end portion 202 of the rope to thereby lock the rope in the position shown in FIG. 1. Alternatively, in order to increase the locking of the boat fender in a preselected position, instead of threading the free end 202 of the rope into rope retaining aperture 134 from the front side of the strap portion, the free end of the rope may be threaded into the back side of the rope retaining aperture 134 so that when drawn tight it is caused to engage longitudinal edge 124 of the strap portion. Accordingly, in the locked position the tethered position of the boat fender designated generally 300 will be maintained and slippage of the rope effectively prevented.

Figure 2:
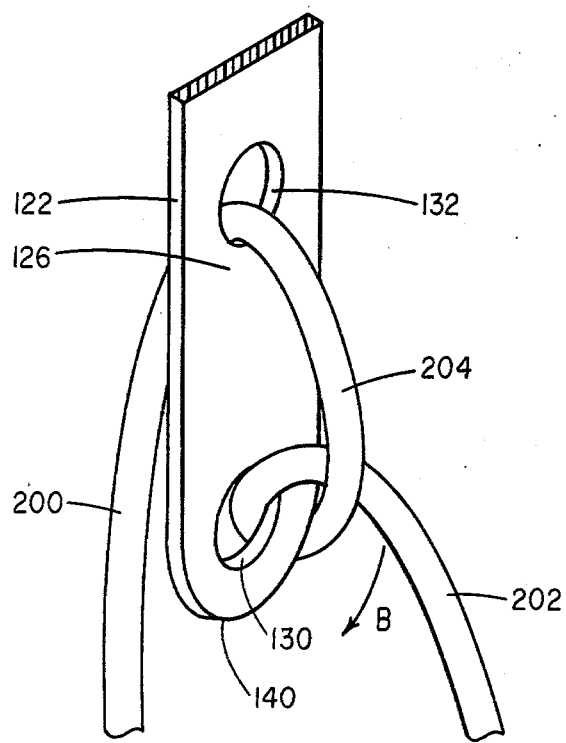
FIG. 2 is an isometric view of a portion of the device shown in FIG. 1 wherein the end portion of the line is being pulled generally in the direction shown in arrow B in FIG. 2 to begin to move a part of the intermediate portion of the line towards the rounded end portion of the anchor to begin the unlocking operation.
Figure 3:
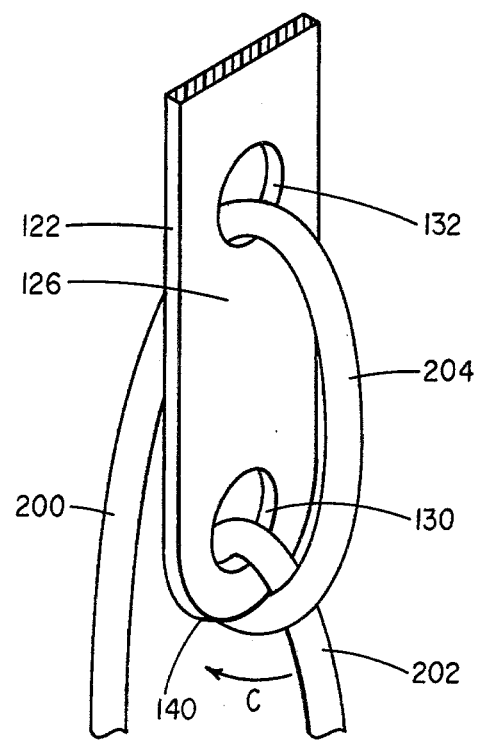
FIG. 3 is a view similar to FIG. 2 wherein the end portion of the rope is nearing its coaxial release position during the unlocking operation.
Figure 4:
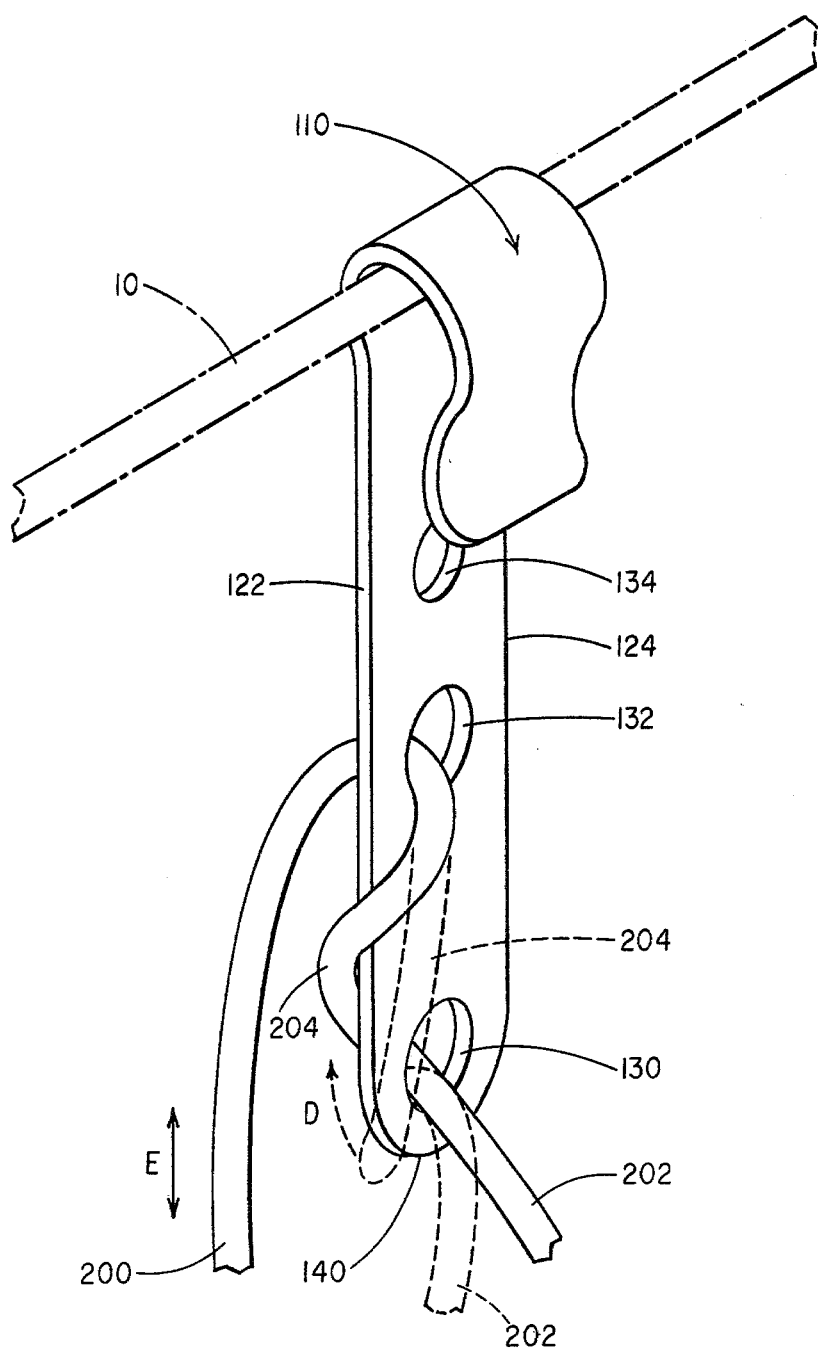
FIG. 4 shows, in dotted outline, the end portion of the rope in its coaxial unlocking position with the intermediate portion of the rope just beginning to automatically slide the rest of the way around the end portion of the anchor, while the solid line position of the rope illustrated in FIG. 4 is the full unlocked position of the rope assumed immediately thereafter.

In tethering a boat fender it is necessary to frequently readjust the boat fender height relative to the side of the boat in order to adjust the boat fenders to protect the boat against damage caused by docks located at different relative elevations. FIGS. 2, 3, and 4 clearly illustrate the ease with which the preferred embodiment anchor of the present invention may be unlocked merely by grasping the free end 202 and pulling that rope free end portion into a coaxial alignment of that rope portion with the axis of the anchor.

Referring now in particular to FIG. 2 which shows a portion of the end of the anchor illustrated in FIG. 1, the initial phase of the unlocking operation is illustrated. The free end 202 of the rope has been removed from rope retaining aperture 134 or from over rod 10 and has been pulled generally manually downwardly in the direction of arrow A in FIG. 1. As seen in FIG. 2 a loop is accordingly formed by the tension applied through free rope end 202, the axis of which loop is substantially perpendicular to the coaxial aperture axis of the anchor. By comparing the rope positions in FIGS. 1 and 2, it will be seen that that portion of the free rope end 202 which is immediately adjacent to aperture 130 has pivoted with respect to that aperture during this phase of the unlocking process. An inner surface of the intermediate rope portion 204 which has contacted the outer surface of the free end portion 202 has ridden across the free rope end during this pivoting process. This pivoting process also tends to draw the rope slightly through aperture 132 to somewhat lengthen the intermediate rope portion 204. Once a loop has been formed in the substantially perpendicular loop position illustrated in FIG. 2, continued downward pulling on rope 202 will cause the loop to track along the arcuate portion of the anchor defined between the rounded tip 140 and the inner edge of aperture 130. During this phase of the unlocking process, the plane of the loop rotates around the center point of aperture 130. Continued pulling of the rope downwardly, as for example, in the direction of arrown B in FIG. 2 will cause the rope to assume the position shown in FIG. 3. In this position, the plane of the loop is approaching the coaxial aperture axis. Continued downward pulling on the free rope end 202 in a direction coincident with a coaxial aperture axis of the anchor will produce a side vector force which will cause the loop to continue to rotate in the direction of arrow C in FIG. 3. That portion of the loop which is formed by part of the intermediate rope portion 204 will cross the coaxial aperture axis before that portion of the loop which is formed by a part of the free rope end 202.

Once that portion of the loop which is formed by the intermediate rope portion 204 passes the coaxial aperture axis, the tension which is applied on the intermediate rope portion 204 from each end thereof will automatically draw the intermediate rope portion through the position shown in phantom in FIG. 4 into the released position which is the solid lined rope position shown in FIG. 4. Once in this position, the height of the fender may be easily adjusted by reducing the tension on free rope end 202 to let the anchor down, or by pulling on free rope end 202 to raise the fender. Once the new tethered position has been reached by the fender the anchor may be relocked by grasping the portion of the intermediate rope portion 204 which is adjacent to longitudinal edge 122 and slipping it back over the rounded end 140 past the coaxial aperture axis, whereupon tension applied on either end of the intermediate rope portion will automatically cause the rope to move at least to the position shown in FIG. 2, whereupon the free rope end 202 may be reinstated into either of the locking positions shown in FIG. 1.

From the above description the improved anchor of the present invention will be seen to provide an extremely reliable method and apparatus for tethering rope suspended boat fenders and for easily repositioning those boat fenders whenever desired.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the U.S. Patent and Trademark Office, and is not intended to limit the scope of the invention described and claimed herein.

What is claimed is:

1. A method for adjustably tethering a rope suspended boat fender comprising the steps of:
   A. providing a rope anchor comprising:
      i. anchoring means for attaching said anchor to a portion of said boat; and
      ii. a strap portion extending away from said anchoring means and terminating in a rounded free end having at least first and second spaced apart eyelet means defined therein for receiving rope threaded therethrough, said strap portion having longitudinal edges extending from said free end and said second eyelet means being disposed adjacent to and being surrounded at least in part by said rounded end,
   B. threading the free end of a rope attached to said boat fender first into said first of said eyelet means from a first side of said strap portion;
   C. threading said rope around a first of said longitudinal edges of said strap portion and into said second eyelet means from said first side of said strap portion, whereby said rope is in a retardedly moveable position for permitting adjustment of the boat fender with respect to the rope anchor; and
   D. selectively sliding the portion of said rope disposed between said eyelet means from engagement with said first of said longitudinal edges, around said rounded end into engagement with a second of said longitudinal edges to selectively retain said rope with respect to said rope anchor, whereby said rope is in a retained position, said rope being moveable back into said retardedly moveable position from said retained position by applying tension on the free end of said rope which is substantially parallel to and directed away from the end of said strap portion, whereby said rope may be caused to slide out of engagement with said second longitudinal edge, around said rounded end, and into engagement with said first longitudinal edge.

2. A method for adjustably tethering a rope suspended boat fender comprising the steps of:
   A. providing a rope anchor comprising:
      i. anchoring means for attaching said anchor to a portion of said boat; and
      ii. a strap portion extending away from said anchoring means and terminating in a rounded free end having at least first and second spaced apart eyelet means defined therein for receiving rope threaded therethrough, said strap portion having longitudinal edges extending from said free end and said second eyelet means being disposed adjacent to and being surrounded at least in part by said rounded free end;
   B. threading the free end of a rope attached to said boat fender first into said first of said eyelet means from a first side of said strap portion;
   C. threading said rope around a first of said longitudinal edges of said strap portion and into said second eyelet means from said first side of said strap portion; and
   D. threading the end of said rope under the portion of said rope between said eyelet means, whereby said rope is in a retained position, said rope being moveable into a retardedly moveable position for permitting adjustment of the boat fender from its retained position by applying tension to the free end of said rope which is substantially parallel to and directed away from said strap portion, whereby said rope may be caused to slide out of engagement with said first longitudinal edge, around said rounded end, and into engagement with a second longitudinal edge; and
   E. selectively sliding the portion of said rope disposed between said eyelet means from engagement with said second longitudinal edge, around said rounded end and into engagement with said first longitudinal edge, to selectively retain said rope with respect to said rope anchor.

* * * * *